E. D. & O. B. REYNOLDS.
Wheel-Hub.

No. 199,863. Patented Jan. 29, 1878.

WITNESSES:
C. Clarence Poole
Geo. H. Evans

INVENTORS
Edmund D. Reynolds
Oliver B. Reynolds
per A. H. Evans & Co.
Attys.

UNITED STATES PATENT OFFICE.

EDMUND D. REYNOLDS AND OLIVER B. REYNOLDS, OF BROCKTON, MASS.

IMPROVEMENT IN WHEEL-HUBS.

Specification forming part of Letters Patent No. 199,863, dated January 29, 1878; application filed January 12, 1878.

*To all whom it may concern:*

Be it known that we, EDMUND D. REYNOLDS and OLIVER B. REYNOLDS, of Brockton, county of Plymouth and State of Massachusetts, have invented certain new and useful Improvements in Wheel-Hubs, of which the following is a clear, full, and exact description, reference being had to the accompanying drawings, making a part of this specification, in which—

Figure 1:
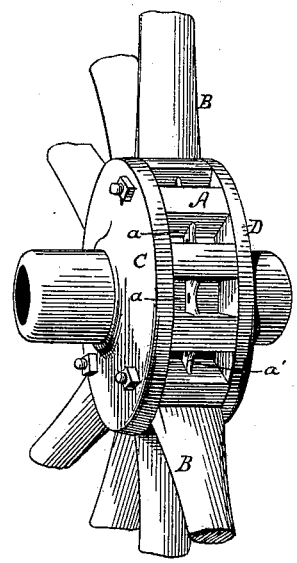
Figure 2:
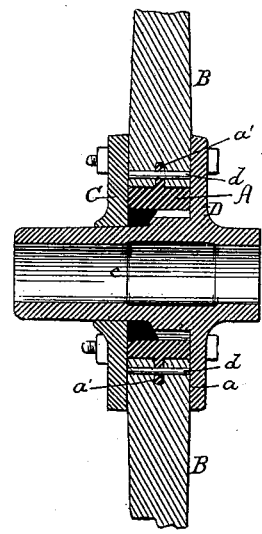
Figure 3:

Figure 1 is a perspective view of a hub with our improvements attached. Fig. 2 is a sectional view. Fig. 3 is a detached view of a spoke.

This invention relates more particularly to the class of three-part wheel-hubs; and the invention consists in the general construction and arrangement of parts, as will be hereinafter fully described.

To enable others skilled in the art to make and use our invention, we will proceed to describe the exact manner in which we have carried it out.

In the drawing, A represents the central portion of the hub, provided with the recess $a$ for the reception of the spokes B. Each recess $a$ is provided with a central projection, $a'$, cast in one piece with the portion A, thus strengthening the casting. Each of the spokes B is provided with a slot, $b$, and when the spokes are inserted in the recesses of the hub, fit snugly over the projections $a'$, and are secured thereto by a transverse pin, $d$, passing through the spoke B and projection $a'$, all as clearly shown in Fig. 2.

C D represent the two flanges, secured upon opposite sides of the portion A by bolts and nuts in the usual manner, the flange D being provided with the axle-box $c$ extending through the portion A and flange C.

In putting the hub together we first drive the spokes in the recesses of the portion A, and then insert the pins through the spokes and projections, after which the flanges C D are securely bolted thereto, which also assist in holding the spokes securely therein, preventing any sidewise movement of them, and also preventing the pins $d$ from working out.

When the hub is taken apart for packing, the spokes remain in the portion A, the projections keeping the spokes from getting out of the recesses.

Having thus described our invention, what we claim as new, and desire to secure by Letters Patent, is—

1. In a three-part wheel-hub, the recessed central portion A, having the projections $a'$ cast integral therewith, substantially as and for the purpose set forth.

2. In a three-part wheel-hub, the recessed central portion A, having the projections $a'$ cast integral therewith, in combination with the slotted spokes B, substantially as and for the purpose set forth.

3. The herein-described wheel-hub, consisting of the recessed central portion A, having perforated projections $a'$, spokes B having central slots $b$ and transverse holes $b'$, the transverse pins $d$, and the flanges C D, the several parts connected together, substantially as specified.

EDMUND DUNBAR REYNOLDS.
OLIVER BRADFORD REYNOLDS.

Witnesses:
ISAAC E. SNELL,
CHAS. W. THAYER.